(12) United States Patent
Jung et al.

(10) Patent No.: US 9,042,341 B2
(45) Date of Patent: May 26, 2015

(54) METHOD OF ZONE SWITCH IN A BROADBAND WIRELESS ACCESS SYSTEM

(75) Inventors: In Uk Jung, Seoul (KR); Yong Ho Kim, Incheon (KR); Ki Seon Ryu, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 79 days.

(21) Appl. No.: 13/255,850

(22) PCT Filed: Mar. 19, 2010

(86) PCT No.: PCT/KR2010/001722
§ 371 (c)(1),
(2), (4) Date: Sep. 9, 2011

(87) PCT Pub. No.: WO2010/107281
PCT Pub. Date: Sep. 23, 2010

(65) Prior Publication Data
US 2012/0026978 A1    Feb. 2, 2012

Related U.S. Application Data

(60) Provisional application No. 61/162,242, filed on Mar. 20, 2009.

(30) Foreign Application Priority Data

Jul. 27, 2009  (KR) .......................... 10-2009-0068349

(51) Int. Cl.
  *H04W 36/34*  (2009.01)
  *H04W 36/38*  (2009.01)
  *H04W 36/14*  (2009.01)
(52) U.S. Cl.
  CPC ............ *H04W 36/385* (2013.01); *H04W 36/14* (2013.01)

(58) Field of Classification Search
  USPC .................................................. 370/330, 331
  See application file for complete search history.

(56) References Cited

U.S. PATENT DOCUMENTS 8,228,872 B2 *  7/2012  Jung et al. ..................... 370/331
2010/0069073 A1   3/2010  Chen et al.
(Continued)

FOREIGN PATENT DOCUMENTS

| CN | 101674626 A | 3/2010 |
| JP | 2008-148134 A | 6/2008 |

(Continued)

OTHER PUBLICATIONS

Liu et al., "Proposed AWD text for HO support for legacy system", IEEE 802.16 Broadband Wireless Access Working Group, IEEE C802.16m-09/0611r10611r2, published on Mar. 2, 2009.*
(Continued)

*Primary Examiner* — Khaled Kassim
*Assistant Examiner* — Zhaohui Yang
(74) *Attorney, Agent, or Firm* — Birch, Stewart, Kolasch & Birch, LLP

(57) ABSTRACT

A method for performing zone switch carried out by an advanced mobile station (AMS) operating in a first zone of a serving advanced base station (serving ABS) supporting a legacy mobile station (MS). The method includes receiving a handover command (AAI-HO-CMD) message indicating zone switching to a second zone of the serving ABS from the first zone, in which the handover command message is received in the first zone and provides information on a Connection Identifier (CID) to be used by the AMS in the second zone; performing network reentry in the second zone using the information on the CID; receiving an unsolicited ranging response (RNG-RSP) message in the second zone after the network reentry in the second zone is finished, in which the unsolicited RNG-RSP message indicates zone switching to the first zone of the serving ABS from the second zone; and performing network reentry in the first zone of the serving ABS. Further, the first zone supports AMSs and the second zone supports legacy MSs.

18 Claims, 9 Drawing Sheets

(56) References Cited

U.S. PATENT DOCUMENTS

| | | | |
|---|---|---|---|
| 2012/0063409 A1* | 3/2012 | Novak et al. | 370/330 |
| 2012/0269169 A1* | 10/2012 | Jung et al. | 370/331 |

FOREIGN PATENT DOCUMENTS

| WO | WO 2006/107701 A2 | 10/2006 |
|---|---|---|
| WO | WO 2007/078043 A2 | 7/2007 |
| WO | WO 2010/107281 A2 | 9/2010 |

OTHER PUBLICATIONS

Chou et al., "Proposed IEEE 802.16m Amendment Text on Handover", IEEE 802.16 Broadband Wireless Access Working Group, IEEE C802.16m-09/0565r1, published on Mar. 2, 2009.*

IEEE Std 802.16e™-2005 (hereinafter 802.16e), p. 137-145, published on Feb. 28, 2006.*

Unsolicited RNG-RSP with Transparent RS, Jan. 16, 2007, Loa et al.*

Lee et al., "Broadband Wireless Access and Local Networks: Mobile WiMAX and WiFi", published 2008.*

Lee et al., "Missing Scenario of Handover Process Supporting Legacy System," IEEE 802.16 Broadband Wireless Access Working Group ,http://ieee802.org/16>, IEEE C802.16m-09/0063r3, Jan. 5, 2009, pp. 1-4.

Yang et al., "Zone Switching Operations in 16e/16m Mixed Mode Operations," IEEE 802.16 Broadband Wireless Access Group, <http://ieee802.org/16>, IEEE C802.16m-09/0532, Mar. 2, 2009, pp. 1-3.

Yang, "Zone switching operations in 16e/16m mixed mode operations", IEEE 802.16 Broadband Wireless Access Working Group <http://ieee802.org/16>, IEEE C802.16m-09/0532, Mar. 2, 2009, pp. 1-3.

* cited by examiner

METHOD OF ZONE SWITCH IN A BROADBAND WIRELESS ACCESS SYSTEM

CROSS REFERENCE TO RELATED APPLICATIONS

This application is the National Phase of PCT/KR2010/001722 filed on Mar. 19, 2010, which claims the benefit under 35 U.S.C. 119(e) of U.S. Provisional Application No. 61/162,242 filed on Mar. 20, 2009, and claims priority under 35 U.S.C. 119 (a) to Patent Application No. 10-2009-0068349 filed in Republic of Korea, on Jul. 27, 2009, all of which are hereby expressly incorporated by reference into the present application.

TECHNICAL FIELD

The present invention relates to a broadband wireless access system, and more particularly to a method for allowing a mobile station (MS) to perform zone switching within coverage of a base station (BS).

BACKGROUND ART

Handover (HO) refers to movement of a mobile station (MS) from a wireless interface of one base station (BS) to a wireless interface of another BS. Hereinafter, a handover procedure in a general IEEE 802.16e system will be described.

A Serving Base Station (SBS) in an IEEE 802.16e network may broadcast information about neighbor BSs through a mobile neighbor advertisement (MOB_NBR-ADV) message in order to inform an MS of information (topology) about basic network configuration.

The MOB_NBR-ADV message includes system information about a serving BS and neighbor BSs, for example, a preamble index, a frequency, a handover optimization possibility, downlink channel descriptor (DCD)/uplink channel descriptor (UCD) information, etc.

The DCD/UCD information includes information of which an MS should be aware in order to exchange information through downlink and uplink. For example, the DCD/UCD information includes handover (HO) trigger information, and medium access control (MAC) version and media independent handover (MIH) capability information of a BS.

A general MOB_NBR-ADV message includes information about neighbor BSs of an IEEE 802.16e type only. Accordingly, information about neighbor BSs of a type other than IEEE 802.16e may be broadcast to MSs through a service identity information advertisement (SII-ADV) message. As a result, an MS may acquire information about BSs of a heterogeneous network by requesting a serving BS to transmit the SII-ADV message.

A procedure for an MS having information about neighbor BSs obtained through the above-described method to perform handover in an IEEE 802.16e network will be described in more detail.

A handover (HO) procedure for use in a general IEEE 802.16e network is classified into 1) HO initiation & preparation, 2) HO execution, and 3) HO completion.

An example of the above-mentioned basic HO procedure will hereinafter be described with reference to FIG. 1.

FIG. 1 illustrates an example of a handover (HO) procedure which can be performed in an IEEE 802.16e system.

Referring to FIG. 1, an MS exchanges data with a serving BS (SBS) at step S101.

The SBS periodically broadcasts information about neighbor BSs to the MS through a MOB_NBR-ADV message at step S102.

The MS may start scanning for candidate handover (HO) BSs using a handover (HO) trigger condition while communicating with the SBS. The MS requests the SBS to perform a handover procedure by transmitting a handover request (MOB_MSHO-REQ) message when a handover condition is satisfied, for example, when a predetermined hysteresis margin value is exceeded at step S103.

The SBS informs candidate handover (HO) BSs included in the MOB_MSHO-REQ message that the MS has requested handover through a handover request (HO-REQ) message at step S104.

The candidate handover (HO) BSs, in response to the MS having requested handover, transmit information about handover to the SBS through a handover response (HO-RSP) message at step S105.

The SBS transmits the information about handover, obtained through the HO-RSP message from the candidate handover (HO) BSs, to the MS through a handover response (MOB_BSHO-RSP) message. The MOB_BSHO-RSP message may include information necessary to perform handover, that is, a handover action time, a handover identifier (HO-ID), and a dedicated handover (HO) code division multiple access (CDMA) ranging code at step S106.

The MS determines one target BS (TBS) among the candidate BSs based on the information included in the MOB_BSHO-RSP message received from the SBS. The MS then transmits a CDMA code to the determined TBS to attempt ranging at step S107.

The TBS receiving the CDMA code may inform the MS of success or failure of ranging and physical correction values through a ranging response (RNG-RSP) message at step S108.

The MS transmits a ranging request (RNG-REQ) message for authentication to the TBS at step S109.

The TBS receiving the RNG-REQ message from the MS transmits system information, which can be used in a corresponding BS, such as a connection identifier (CID) to the MS through a ranging response (RNG-RSP) message at step S110.

If the TBS successfully completes authentication of the MS and transmits all update information, the TBS informs the SBS of success or failure of handover through a handover completion (HO-CMPT) message at step S111.

It is assumed that the above-mentioned HO procedure is carried out between the MS and the BS that are based on the IEEE 802.16e standard (WirelessMAN-OFDMA Reference System). For convenience of description, a system for use in a general technology including the IEEE 802.162 standard is hereinafter referred to as a 'legacy system'. In addition, the MS for use in the legacy technology is referred to as a 'Yardstick MS (YMS)' or a 'legacy MS', and the BS for use in the legacy technology is referred to as a 'legacy BS' or a Yardstick MS (YMS)'.

In addition, a specific MS, that employs the IEEE 802.16m standard (WirelessMan-OFDMA Advanced System) and an improved technology superior to a general technology, is referred to as an 'Advanced MS (AMS)' or a "New AMS'. A specific BS for us in the advanced technology is referred to as an 'Advanced BS (ABS)' or a 'New BS'.

For convenience of description, it is assumed that AMS is connected to YBS such that it receives a necessary service from the YBS, and an ABS (WirelessMAN-OFDMA Reference System/WirelessMAN-OFDMA Advanced co-existing System) for supporting the AMS and the YMS are present in the neighborhood of the YBS.

The YBS includes only a Legacy Zone (LZone) having a physical channel frame structure applied to a legacy system. Under the condition that the ABS supports only the AMS (WirelsMAN-OFDMA advanced system only), it is assumed that the ABS includes only a new MS support zone (Mzone: 16M Zone) applied to a new system. It is assumed that the ABS (WirelessMAN-OFDMA Reference System/WirelessMAN-OFDMA Advanced co-existing Systemlegacy supportive) for supporting the AMS and the YMS includes a legacy zone (LZone) and an M zone (16M Zone). In addition, it is assumed that the ABS employs TDD (Time Division Duplex) for each of uplink and downlink in time units, for example, in units of a frame or subframe.

Moreover, it is assumed that the AMS is able to receive services from both the ABS and the YBS. That is, the AMS can receive a necessary service through either of Mzone and LZone, and it is also assumed that the AMS is able to perform both a first HO execution process defined in the legacy system and a second HO execution process defined in a new system.

Generally, in order to allow the AMS to perform a handover (HO) from a serving YBS to the ABS supporting both the AMS and the YMS, the AMS first enters the legacy zone (LZone), such that it may continue to receive a necessary service from the LZone or may perform zone switching to the MZone (16M Zone). In addition, the AMS may immediately perform handover (HO) to the MZone without entering the LZone of the ABS.

SUMMARY OF THE INVENTION

Accordingly, the present invention is directed to a method for performing zone switching in a broadband wireless access system that substantially obviates one or more problems due to limitations and disadvantages of the related art.

In the case where a general system standard (e.g., IEEE 802.16e) and an improved system (e.g., IEEE 802.16m) coexist (WirelessMAN-OFDMA Reference System/WirelessMAN-OFDMA Advanced co-existing System), there is needed an effective handover (HO) method having backward compatibility, such that an MS for use in an improved system is able to perform handover (HO). In other words, when the AMS is handed over from the YBS to the ABS supporting the YMS and the AMS, it is necessary for the AMS to inform the ABS that the AMS performs AMS operations so as to receive a new system standard service from the ABS. In addition, if the ABS is handed over to the AMS, the ABS needs to transmit ABS system information (i.e., MZone (16M Zone) system information) for a new system to the AMS. In other words, the AMS must attempt to perform ranging to the MZone so as to receive a new system standard service of the AMS, such that it is necessary to issue a Bandwidth Request (BR).

In addition, the conventional art does not disclose operations of an exemplary case in which the AMS must perform zone switching to the legacy zone (LZone) because of a condition of the MZone while receiving a necessary service from the MZone of the ABS that supports the YMS and the AMS.

In addition, a procedure needed when the AMS performs zone switching to the LZone and then performs zone switching to the Mzone is not defined.

An object of the present invention devised to solve the problem lies on a method for allowing an advanced MS (AMS) to effectively perform handover (HO) within coverage of a legacy serving base station (SBS).

Another object of the present invention devised to solve the problem lies on a method for allowing an AMS to effectively perform zone switching within coverage of an advanced BS (ABS).

Another object of the present invention devised to solve the problem lies on a method for allowing an AMS to effectively perform zone reswitching within coverage of the ABS.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

The object of the present invention can be achieved by providing a method for controlling an advanced mobile station (AMS) to perform zone switching in an MZone of a serving advanced base station (serving ABS) supporting a legacy mobile station (MS), the method including receiving a handover command (AAI_HO-CMD) message indicating zone switching to a legacy zone (LZone) from the MZone, and receiving a MAP message from the LZone.

The AAI_HO-CMD message may include a specific field indicating a handover (HO) type, wherein the specific field indicating the HO type may be set to a value indicating zone switching.

The AAI_HO-CMD message may include an action time field, and the AMS may perform the zone switching at a time indicated by the action time field.

The AAI_HO-CMD message may include at least one of capability information of the LZone, system information, security parameter, a Connection Identifier (CID), and a Flow Identifier (FID), wherein the CID and the FID may be adapted to identify connection of the AMS in the LZone.

The AAI_HO-CMD message may include a Base Station Identifier (BSID) field, where the BSID field may be set to a BSID value of the serving ABS.

The method may further include periodically receiving a super frame header (SFH) of the MZone so as to determine a load status of the MZone.

The AAI_HO-CMD message may further include a zone switch check time, and the receiving of the SFH is carried out at intervals of a specific time indicated by the zone switch check time field.

The method may further include transmitting a bandwidth request (BR) message, that indicates zone switching to the MZone using the ZS TLV, to the MZone.

The method may further include, when the load status shown in the SFH of the MZone satisfies a predetermined reference, transmitting a bandwidth request (BR) message for indicating zone switching to the MZone to the MZone.

The method may further include receiving an unsolicited ranging response (RNG-RSP) message indicating zone switching to the MZone from the LZone.

The unsolicited RNG-RSP message may include zone switching information (Zone Switch (ZS) TLV) necessary for the AMS to perform zone switching from the LZone to the MZone.

The zone switching information (ZS TLV) may include at least one of a Station Identifier (STID) for identifying the AMS in the MZone, a Flow Identifier (FID), a Zone Switch (ZS) action time for indicating a specific time at which zone switching to the MZone is performed, and an uplink (UL) grant for Bandwidth Request (BR) (UL grant for BR) information.

The method may further include transmitting a bandwidth request (BR) message, that indicates zone switching to the MZone using the ZS TLV, to the MZone.

In another aspect of the present invention, provided herein is a method for controlling a serving advanced base station (serving ABS) supporting a legacy mobile station (MS) to perform zone switching of an advanced mobile station (AMS), the method including transmitting a handover command (AAI_HO-CMD) message indicating zone switching to a legacy zone (LZone) to the AMS through an MZone, and transmitting a MAP message of the LZone to the AMS.

The AAI_HO-CMD message may include a specific field indicating a handover (HO) type, wherein the specific field indicating the HO type is set to a value indicating zone switching.

The AAI_HO-CMD message may include an action time field, and the transmitting of the MAP message may be carried out at a time indicated by the action time field.

The AAI_HO-CMD message may include at least one of capability information of the LZone, system information, security parameter, a Connection Identifier (CID), and a Flow Identifier (FID), wherein the CID and the FID are adapted to identify connection of the AMS in the LZone.

The AAI_HO-CMD message may include a Base Station Identifier (BSID) field, where the BSID field may be set to a BSID value of the serving ABS.

The method may further include transmitting a ranging response (RNG-RSP) message indicating zone switching to the MZone to the AMS through the LZone.

The ranging response (RNG-RSP) message may be transmitted in an unsolicited mode, and include zone switching information (Zone Switch (ZS) TLV) necessary for the MS to perform zone switching from the LZone to the MZone. The zone switching information (ZS TLV) may include at least one of a Station Identifier (STID) for identifying the AMS in the MZone, a Flow Identifier (FID), a Zone Switch (ZS) action time for indicating a specific time at which the MS performs zone switching to the MZone, and an uplink (UL) grant for Bandwidth Request (BR) (UL grant for BR) information.

In another aspect of the present invention, provided herein is a mobile station (MS) including a processor, a reception (Rx) module, a transmission (Tx) module, and an antenna for transmitting a radio frequency (RF) signal received from an external part to the reception (Rx) module, and transmitting a Radio frequency (RF) signal received from the transmission (Tx) module to an external part. The reception (Rx) module may demodulate and decode the RF signal received from the antenna, and the transmission (Tx) module may modulate and encode data received from the processor. If a handover command (AAI_HO-CMD) indicating zone switching from an MZone of a serving advanced mobile station (serving ABS) to a legacy zone (LZone) is transmitted through the reception (Rx) module, the processor may receive a MAP message from the LZone using information contained in the AAI_HO-CMD message, and thus performs zone switching.

The AAI_HO-CMD message may include a specific field indicating a handover (HO) type, wherein the specific field indicating the HO type may be set to a value indicating zone switching.

The AAI_HO-CMD message may include an action time field, and the AMS may perform the zone switching at a time indicated by the action time field.

The AAI_HO-CMD message may include at least one of capability information of the LZone, system information, security parameter, a Connection Identifier (CID), and a Flow Identifier (FID), wherein the CID and the FID are adapted to identify connection of the AMS in the LZone.

The AAI_HO-CMD message may include a Base Station Identifier (BSID) field, where the BSID field is set to a BSID value of the serving ABS.

The exemplary embodiments of the present invention have the following effects.

First, the AMS can be effectively handed over from a legacy serving base station.

Second, the AMS can effectively perform zone switching within coverage of the ABS.

Third, the AMS can effectively re-perform zone switching within coverage of the ABS.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

DETAILED DESCRIPTION OF THE EMBODIMENTS

Figure 1:
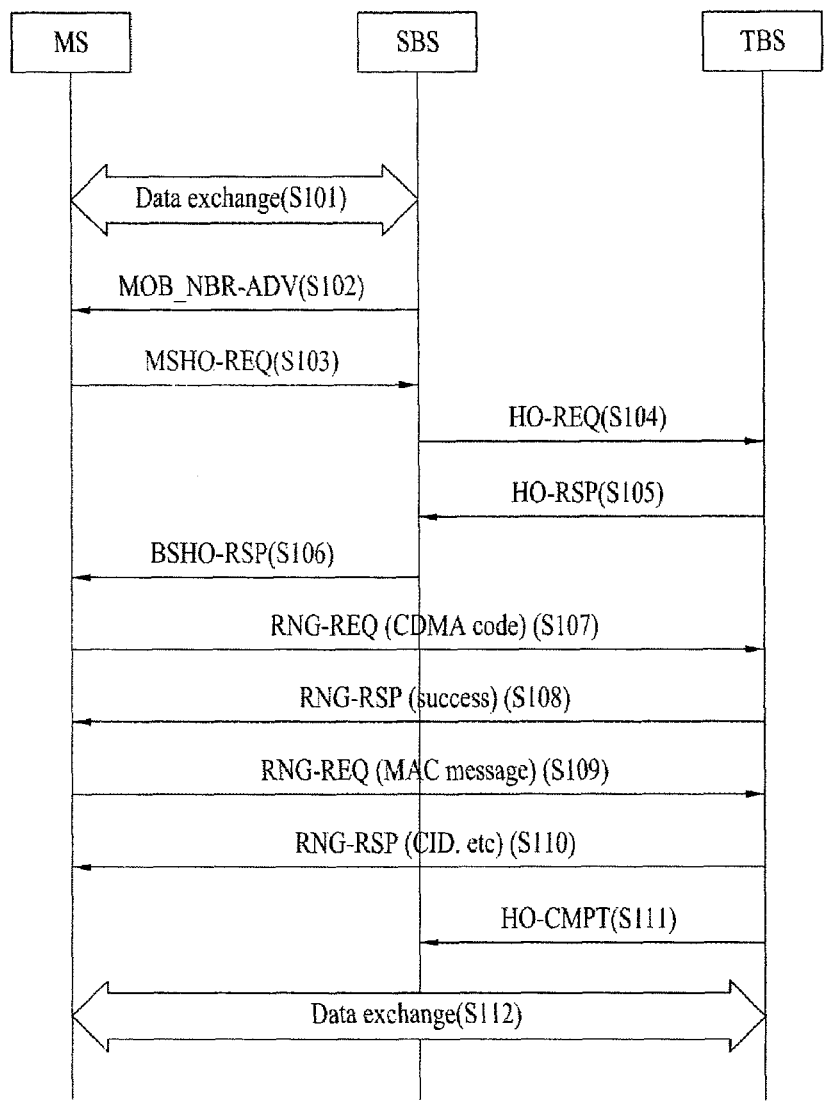
FIG. 1 is a flowchart illustrating a handover (HO) procedure for use in an Institute of Electrical and Electronics Engineers (IEEE) 802.16e system.

Exemplary embodiments of the present invention provide a variety of methods for allowing an advanced MS (AMS) to effectively perform zone switching.

Exemplary embodiments described hereinbelow are combinations of elements and features of the present invention.

The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment.

In the exemplary embodiments of the present invention, a description is made of a data transmission and reception relationship between a base station (BS) and a mobile station (MS). Here, the BS refers to a terminal node of a network communicating directly with the MS. In some cases, a specific operation described as performed by the BS may be performed by an upper node of the BS.

Namely, in a network comprised of a plurality of network nodes including a BS, various operations performed for communication with an MS may be performed by the BS, or network nodes other than the BS. The BS may be replaced with the term 'fixed station', 'Node B', 'eNode B (eNB)', 'access point (AP)', 'Advanced BS (ABS)', etc. The MS may be replaced with the term 'user equipment (UE)', 'terminal', 'mobile subscriber station (MSS)', 'Advanced MS (AMS)', 'subscriber station (SS)', etc.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The embodiments of the present invention can be supported by standard documents disclosed in at least one of the IEEE 802 system, 3GPP system, 3GPP LTE system, and 3GPP2 system which are radio access systems. That is, steps or portions that are not described in the embodiments of the present invention for the sake of clearly describing the spirit of the present invention may be supported by the above documents. For all terms used in this disclosure, reference can be made to the above standard documents. Especially, the embodiments of the present invention may be supported by at least one of P802.16-2004, P802.16e-2005, and P802.16Rev2 which are standard documents of the IEEE 802.16 system.

The specific terms described in the following description are provided to aid the understanding of the present invention and these terms may be changed without departing from the spirit of the present invention.

Hereinafter, for convenience of description and better understanding of the present invention, it is assumed that the legacy system is an IEEE 802.16e system and the new system is an IEEE 802.16m system.

The MOB_NBR-ADV message broadcast from the YBS of a general legacy system may include overall system information of a neighbor BS. Specifically, the included system information may include information about downlink channel descriptor (DCD)/uplink channel descriptor (UCD) values that are inconsistent between a serving BS and a neighbor BS. The DCD/UCD information may be used to update the system information when the MS performs HO or enters a network. An example of such DCD channel encoding will hereinafter be described with reference to Table 1.

Table 1 shows an example of TLV encoding information for indicating a Medium Access Control (MAC) version of a neighbor BS system. The MAC version may be contained in a DCD of a MOB_NBR-ADV message broadcast from a YBS, and be transmitted to a destination.

TABLE 1

| Type | Length | Value | Scope |
|---|---|---|---|
| 148 | 1 | Version number of IEEE 802.16 supported on this channel 0: IEEE 802.16m Only 1-7: Indicated conformance with an earlier and/or obsolete version of IEEE Std 802.168: Indicates conformance with IEEE Std 802.16-20089: Indicated conformance with IEEE Std 802.16m (Legacy Support) 10-255: Reserved | PMP: DCD, RNG-REQ |

The legacy system may reserve MAC version values 0, and 9 to 255 without using them. In contrast, according to the present invention, the value of '0' may indicate a MAC version of the ABS supporting only the AMS (WirelessMAN-OFDMA advanced system only, 16m only), and the value of '9' may indicate an ABS supporting both a YMS and an AMS (WirelessMAN-OFDMA Reference System/WirelessMAN-OFDMA Advanced co-existing System, legacy support).

In other words, if the ABS has the value of '0' in association with the DCD TLV type 148, this means that a corresponding ABS can support only a new system (IEEE 802.16m). That is, if the ABS assigns the value of '0' to the DCD TLV type 148, this means that the ABS supports only a feature and service defined in the new system (IEEE 802.16m) using only an IEEE 802.16m dedicated frame structure (i.e., AMS support zone (Mzone)). Therefore, if a specific MS desires to perform handover to the ABS network in which the DCD TLV type 148 is set to zero '0', the specific MS must have dedicated functions for the AMS.

In addition, if the ABS has a MAC version value of '9', this means that a corresponding ABS supports a legacy MS (also called 'YMS'). If a specific MS desires to perform handover (HO) to the network in the ABS having the MAC version value of '9', the specific MS must have unique functions of the YMS or the AMS.

The above-mentioned result is obtained according to various rules prescribed between the MS and the BS. That is, the MS does not attempt to perform HO to a BS that has a MAC version value lower than the MS MAC version value (Refer to IEEE standard specification P802.16Rev2/D8 11.1.3)

Therefore, when using the corrected DCD encoding shown in Table 1, AMSs in the neighborhood of the serving YBS may have a MAC version value of '0' or '9' by determining whether to support the legacy MS. The MAC version value is different from a value '1' or '8' capable of being owned by the serving YBS, such that it may be contained in a DCD value of the MOB_NBR-ADV message broadcast from the YBS.

When YMSs connected to the serving YBS obtain ABS information through the MOB_NBR-ADV message, the ABS supporting only the AMS has a MAC version value of '0', such that the ABS recognizes that its own MAC version values of 1 to 8 are less than the MAC version value of '0'. As a result, the YMS does not attempt to perform handover (HO) to the ABS supporting only the AMS. If an ABS is operated as a legacy support ABS (WirelessMAN-OFDMA Reference System/WirelessMAN-OFDMA Advanced co-existing System), a MAC version value may be set to '9'. The MAC version value of '9' is higher than other MAC version values 1 to 8 capable of being owned by a YMS, such that the YMS may attempt to perform handover (HO) to the ABS supporting the legacy MS. Therefore, the present invention more effectively considers the YMS using the above corrected MAC version values, such that it can provide information about a neighbor ABS of the YBS to the AMS.

Figure 2:
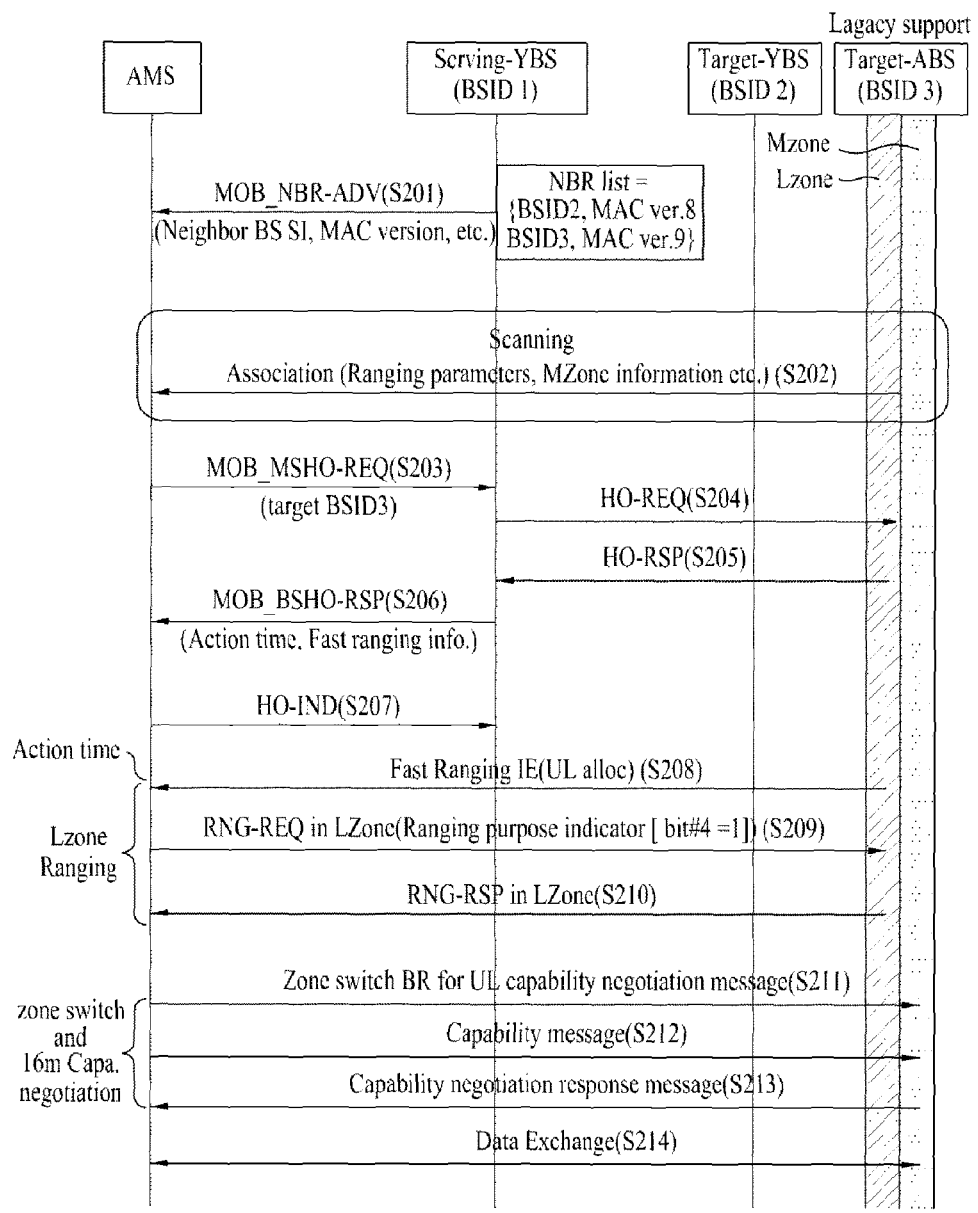
FIG. 2 is a flowchart illustrating a general handover (HO) procedure using zone switching.

FIG. 2 is a flowchart illustrating a general handover (HO) procedure using zone switching.

In FIG. 2, a fast ranging procedure is used. In the fast ranging, a CDMA ranging code is transmitted to omit an uplink synchronization process and the ranging request (RNG-REQ) message is then transmitted, such that a HO delay time can be selectively minimized in the IEEE 802.16-based wireless mobile communication system.

Referring to FIG. 2, it is assumed that the AMS receives a necessary service from the serving YBS (BSID 1), and another YBS (BSID 2) and an ABS (WirelessMAN-OFDMA Reference System/WirelessMAN-OFDMA Advanced co-existing System, legacy support, (BSID 3)) are simultaneously present in the neighborhood of the YBS. At this time, it is assumed that a MAC version value of the serving YBS is set to 7 and a MAC version value of another YBS (BSID 2) is set to 8. In addition, the target ABS (BSID 3) supports both the YMS and the ABS, such that it is assumed that the MAC version value is set to 9 as shown in Table 1.

In addition, it is assumed that the YBS has only the legacy zone (LZone) as previously stated above, and it is also assumed that the ABS (BSID 3) supporting both AMS and YMS includes the legacy zone (LZone) and an AMS support zone (i.e., MZone).

Referring to FIG. 2, the serving YBS periodically broadcasts neighbor BS information belonging to the serving YBS through a MOB_NBR-ADV message, and the AMS receives the MOB_NBR-ADV message and obtains information of the neighbor BS at step S201.

In this case, the MOB_NBR-ADV message broadcast from the serving YBS (BSID 1) may include DCD information of a neighbor BS that has another value different from that of the serving YBS. Specifically, according to the above-mentioned assumption, MAC version values of all candidate BSs (BSIDs 2 and 3) are different from the MAC version value of the serving YBS, such that the MAC version values of all the candidate BSs may be contained in the DCD TLV type 148 of the MOB_NBR-ADV message broadcast from the serving YBS.

The AMS may start scanning for candidate handover (HO) BSs using a handover (HO) trigger condition while communicating with the serving YBS at step S202.

The AMS requests the serving YBS to perform a handover procedure by transmitting a handover request (MOB_M-SHO-REQ) message when a handover condition is satisfied, for example, when a predetermined hysteresis margin value is exceeded. In this case, the AMS may include information about its own preferred BS (herein, BSID 3) in the MOB_M-SHO-REQ message at step S203.

The serving YBS may inform candidate handover (HO) BSs included in the MOB_MSHO-REQ message that the AMS has requested handover through a handover request (HO-REQ) message at step S204.

The candidate HO BSs take action for the MS having requested handover (HO) to transmit information about handover (HO) to the serving YBS through a handover response (HO-RSP) message at step S205.

The serving YBS transmits the information about handover (HO), obtained through the HO-RSP message from the candidate handover (HO) BSs, to the AMS through a handover response (MOB_BSHO-RSP) message. Specifically, the MOB_BSHO-RSP message may include a field of an action time where fast ranging information element (Fast_Ranging_IE) information of the candidate HO BSs is transmitted to the AMS at step S206.

The AMS having obtained the Fast_Ranging_IE message through the action time field decides to perform HO to the target ABS (BSID 3), and transmits a handover indication (MOB_HO-IND) message to the serving YBS at step S207.

Thereafter, the AMS receives the Fast_Ranging_IE message from the target ABS (BSID 3) at a specific time indicated by the action time field, such that it may acquire uplink (UL) allocation information to transmit a ranging request (RNG-REQ) message at step S208.

The AMS transmits the RNG-REQ message to the LZone of the ABS using UL resources indicated by the received UL allocation information at step S209.

In this case, the AMS may request the ABS to perform zone switching. In this case, the term 'Zone Switching' means that the AMS performs zone switching from LZone to MZone, such that the AMS can receive a necessary service in the range of MZone.

In order to inform the target ABS of a zone switching request, the AMS may use a Ranging Purpose Indication field of the RNG-REQ message, and a detailed description thereof will hereinafter be described with reference to Table 2.

Table 2 shows an example of the Ranging Purpose Indication field related to embodiments of the present invention.

TABLE 2

| Name | Type | Length | Value |
| --- | --- | --- | --- |
| Ranging Purpose Indication | 6 | 1 | Bit 0: HO indication (may be combined with other included information elements). If Ranging Purpose Indication field is set to '1' this means that MS commands BS to perform HO or network re-entry in idle mode. Bit 1: Location update request (If Ranging Purpose Indication field is set to '1' this means that a location update procedure is performed in idle mode) Bit 2: Seamless HO indication (may be combined with other information elements). If Ranging Purpose Indication field is set to '1' this means that MS starts ranging for seamless HO procedure) Bit 3: Ranging Request for Emergency Call Setup (If Ranging Purpose Indication field is set to '1' this means an emergency call procedure of MS Bit 4: HO indication of 16m MS (AMS) Bits 5-7: Reserved |

'Bit 4' in the Ranging Purpose Indication field used in a general legacy system (e.g., IEEE 802.16e system) may be changed as shown in Table 2. Accordingly, 'Bit 4' is set to '1' when the AMS transmits the RNG-REQ message to the ABS, such that the AMS may inform the target ABS that the AMS has performed HO through zone switching. If the target ABS receives the RNG-REQ message in which 'Bit 4' of the Ranging Purpose Indication field is set to '1', it may determine whether an MS having transmitted the RNG-REQ message is operated as an AMS without receiving additional information.

On the other hand, the AMS may further include its own version information in the RNG-REQ message so as to inform the target ABS that the AMS is operated as a new MS (i.e., AMS).

In response to the RNG-REQ message, the target ABS (BSID 3) transmits a ranging response (RNG-RSP) message to the AMS at step S210.

Therefore, the AMS enters the legacy zone (LZone) of the target ABD. After that, the AMS requests a bandwidth for transmitting the RNG-REQ message from the MZone of the target ABS so as to perform zone switching to the MZone of the target AMS at step S211.

If the AMS receives the requested bandwidth from the AMS, it transmits a request message for capability negotiation at step S212. The ABS transmits a response message to the request message to the AMS such that it can finish the capability negotiation at step S213.

In this case, the request message for capability negotiation may be an AAI_RNG-REQ (Advanced Air Interface Ranging-Request) message, and a response message to the AAI_RNG-REQ message may be an AAI_RNG-RSP (Advanced Air Interface-Ranging-Response) message.

After that, the AMS may exchange data in the MZone of the ABS at step S214. In order to perform a bandwidth request (BR) during the above-mentioned HO procedure at step S211, the AMS needs to obtain a Station ID (STID) to be used in the MZone of the target ABS.

A bandwidth request (BR) message to be transmitted to the MZone should include an STID of the AMS, and the AMS STID should be contained in an STID field, such that the AMS can transmit the UL grant message to the AMS using the corresponding STID.

If the STID is pre-acquired by the AMS, there arise no problems. Otherwise, a procedure for receiving an STID through the CDMA code ranging is further needed. The AMS has already been synchronized or authenticated in the LZone of the ABS, such that the execution of such code ranging may cause unnecessary time delay. The CDMA code ranging is base on contention. So, if the CDMA code ranging collides with a CDMA code transmitted from another AMS, an additional delay is encountered.

Moreover, the AMS must exchange relatively large amounts of information with the ABS within coverage of the ABS MZone. For example, the AMS may perform capability negotiation or system information update through the AAI_RNG-REQ/RSP message in the ABS MZone, so that the AMS can exchange data with the ABS. Therefore, if required, a first AAI_RNG-REQ message for general use and a second AAI_RNG-REQ message for zone switching may have data of different sizes. Therefore, in the case of resource allocation of UL resources allocated by CDMA code ranging, there may be a difference between the first and second AAI_RNG-REQ messages.

The above-mentioned problem may be encountered in a procedure needed for transmitting the AAI_RNG-REQ message for zone switching instead of the other AAI_RNG-REQ message for general use. Accordingly, the present invention proposes a more effective zone switching method and an HO method using the same.

The method for effectively performing zone switching of the AMS is largely classified into two methods, one of the two methods is designed to use a bandwidth request (BR) procedure, and the other is designed to use the CDMA ranging code. The zone switching procedure using the BR procedure has advantages in that it can pre-receive some information required for the MZone from the LZone, such that the ranging for unnecessary synchronization may be omitted. The zone switching method using the CDMA ranging code need not pre-receive a Station ID (STID) and the like, and may directly receive additional MZone information from a corresponding zone.

1. Zone Switching Method Using BR Procedure

In accordance with one embodiment of the present invention, the zone switching method using a bandwidth request (BR) is provided, and a detailed description thereof will hereinafter be described with reference to FIGS. 3 to 7. Prior to describing the zone switching method shown in each drawing, the parts commonly applied to FIGS. 3 to 7 will hereinafter be described.

In FIGS. 3 to 7, it is assumed that the ABS (WirelessMAN-OFDMA Reference System/WirelessMAN-OFDMA Advanced co-existing System) (BSID 3) supporting both a YMS and an AMS is present in the neighborhood of the serving YBS (BSID 1). In addition, as described above, it is assumed that the YBS only has a legacy zone (LZone), and the ABS supporting both AMS and YMS includes both LZone and MZone.

In addition, the MOB_NBR-ADV message broadcast from the serving YBS (BSID 1) may include DCD information of a neighbor BS that has a value different from that of the serving YBS. Specifically, the MAC version value of the ABS (BSID 3) may be contained in a DCD TLV type 148 of the MOB_NBR-ADV message broadcast from the serving YBS (BSID 1).

Figure 3:
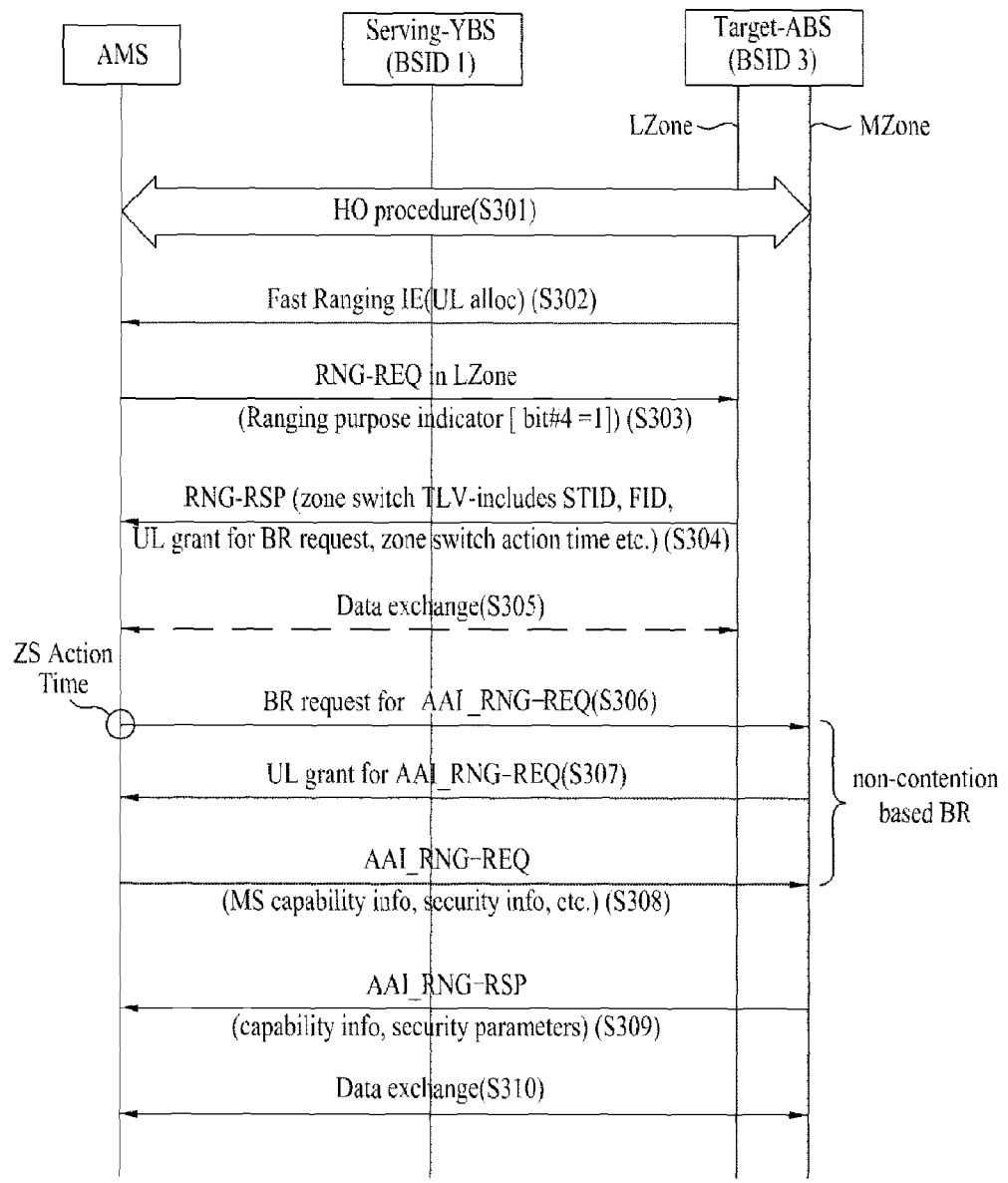
FIG. 3 is a flowchart illustrating a method for allowing an Advanced MS (AMS) to perform zone switching through a bandwidth request (BR) procedure according to one embodiment of the present invention.

FIG. 3 is a flowchart illustrating a method for allowing an Advanced MS (AMS) to perform zone switching through a bandwidth request (BR) procedure according to one embodiment of the present invention.

Referring to FIG. 3, the AMS may perform a handover (HO) procedure as a preparation step for zone switching at step S301.

In this case, the handover (HO) procedure includes one step for obtaining neighbor BS information (MAC version information, operation time, etc.) from the serving YBS as shown in steps S201 to S207, and also includes the other step for determining whether to perform HO to the target ABS (BSID 3) and transmitting a HO indication (HO-IND) message to the serving YBS according to the determined result.

The above-mentioned procedures may include not only an MS-initiated HO operation obtained by a request of the MS and a BS-initiated HO operation obtained by a request of the serving BS. For convenience of description and better understanding of the present invention, a detailed description of the MS-initiated HO case and the BS-initiated HO case will herein be omitted.

After that, the AMS receives the Fast_Ranging_IE message from the target ABS (BSID 3) at a specific time indicated by the action time field, such that it can obtain UL allocation information for transmitting the RNG-REQ message at step S302.

The AMS transmits the RNG-REQ message to the LZone of the ABS using UL resources indicated by the received UL allocation information at step S303.

In this case, the AMS assigns a value of '1' to 'Bit 4' of the Ranging Purpose Indication field to the RNG-REQ message, such that it may transmit a request for zone switching (also called a Zone Switch Request) to the ABS. In addition, the RNG-REQ message may include MAC version information of the AMS so as to inform the target ABS that the AMS is a new MS.

The target ABS receives the RNG-REQ message, such that it can recognize that the AMS has requested zone switching. Accordingly, Zone Switch TLV (ZS TLV) needed for zone switching may be contained in the RNG-RSP message, and the resultant RNG-RSP message including the ZS TLV may be transmitted to the AMS at step S304.

The ZS TLV may include a Station ID (STID) to be used by the AMS in an MZone of the ABS, a Flow ID (FID), a 'UL grant for BR' message to transmit a BR message to the MZone, a Zone Switch action time, and the like.

The reason why the above information is needed is as follows.

In order to allow the AMS to perform zone switching to the MZone of the ABS, it is necessary to update zone specific system information, such as capability negotiation information or security parameters. Such information update may be carried out using a new ranging request (AAI_RNG-REQ) message and a new ranging response (AAI_RNG-RSP) message when the AMS performs zone switching to the MZone. In order to allow the AMS to transmit the AAI_RNG-REQ message, it is necessary for the AMS to pre-receive UL resources required for transmitting the AAI_RNG-REQ message through the UL grant message.

The UL grant message for the AAI_RNG-REQ message may be transmitted from the ABS to the AMS upon receiving a BR request for the AAI_RNG-REQ message from the AMS. In the case of transmitting the bandwidth request (BR) message and the UL grant message, an STID used when the AMS identifies the AMS in the MZone is needed. Also, in order to allow the AMS to transmit the BR message related to the AAI_RNG-REQmesage to the ABS, it is necessary for the AMS to pre-receive UL resources for the BR message. Accordingly, an STID may be contained in the ZS TLV and 'UL grant for BR' for BR message transmission may be contained in the MZone.

The AMS receives the RNG-RSP message and re-enters the LZone of the ABS, such that it may exchange data with the ABS. Otherwise, the AMS may immediately go to the next procedure without re-entering the ABS LZone at step S305.

The AMS may transmit a BR message (i.e., BR header) for transmission of the AAI_RNG-REQ message to the MZone of the ABS using the STID obtained through the RNG-RSP message at step S306.

In this case, since the AMS has received the 'UL grant for BR' information needed for transmitting the BR message from the ABS at step S304, the BR procedure becomes a 'non-contention based BR' scheme. In addition, the BR message may be transmitted at a specific time indicated by the zone switching operation time. That is, UL resources for transmitting the BR message may be assigned at a specific time indicated by the zone switching action time.

Upon receiving the BR message from the AMS, the ABS transmits 'UL grant for AAI_RNG-REQ' information to the AMS at step S307. In this case, the 'UL grant for AAI_RNG-REQ' information includes UL allocation information for allowing the AMS to transmit the AAI_RNG-REQ message at step S307.

The AMS transmits the AAI_RNG-REQ message to the ABS MZone using UL resources indicated by the UL grant that has been received from the ABS at step S308.

In this case, the AAI_RNG-REQ message may include capability information of the AMS for capability negotiation, and security information. The capability information of the AMS may include information about multi-carrier, femto capability, relay capability, physical capability, media independent handover (MIH) capability, and EMBS.

The ABS transmits information about the capability negotiation with the MS and security parameters to the AMS through an AAI_RNG-RSP message at step S309.

In this case, the ABS may additionally inform the AMS of procedures which can be omitted during zone switching through a handover optimization flag of the AAI_RNG-RSP message.

The AMS finishes zone switching to the MZone of the ABS through the above-described procedures and may perform normal data exchange at step S310.

Through the above-mentioned methods, the AMS may perform zone switching through more effective and easier procedures.

A brief description of the above-mentioned zone switching method is as follows. First, the AMS decides to perform HO, sets 'Bit 4' of the Ranging Purpose Indication field contained in the RNG-REQ message to the value of '1', and transmits the resultant message to the LZone of the target AMS.

Upon receiving the resultant message from the AMS, the ABS may transmit a zone switching TLV to the AMS. The AMS obtains an STID and specific information (such as an STID or a zone switching action time) required for zone switching using the zone switching (ZS) TLV, and may transmit 'BR for AAI_RNG-REQ' information to the ABS MZone. In this case, the 'BR for AAI_RNG-REQ' information is required for transmitting the AAI_RNG-REQ message to the ABS MZone.

In this case, if the zone switching (ZS) TLV includes a UL grant for BR, a non-contention based BR scheme is used, and otherwise, a 3-step or 5-step contention based BR scheme is used. Here, the difference between the 3-step contention based BR scheme and the 5-step contention based BR scheme is whether to separately perform a procedure in which UL resources for a bandwidth request (BR) to transmit the AAI_RNG-REQ message are requested through a BR code.

That is, in the 3-step contention based BR scheme, the AMS requests a BR for AAI_RNG-REQ transmission (i.e., BR for AAI_RNG-REQ), and, at the same time, transmits a BR code. In contrast, in the 5-step contention based BR scheme, the AMS first transmits the BR code, receives a 'UL grant for BR' to transmit the BR message, and requests a BR for AAI_RNG-REQ transmission so as to transmit the AAI_RNG-REQ message.

The ABS may transmit a 'UL grant for AAI_RNG-REQ' to the AMS so as to answer the 'BR for AAI_RNG-REQ' message from the AMS.

The AMS receives the UL grant from the ABS, and transmits the AAI_RNG-REQ message to the MZone of the ABS using UL resources indicated by UL allocation information included in the UL grant. As a response to the AAL_RNG-REQ message, the ABS may transmit the AAI_RNG-RSP message to the AMS. Through this process, the AMS transmits and receives information of capability negotiation and security information to and from the ABS. The AMS completes zone switching to the MZone of the ABS and performs data exchange.

Hereinafter, a zone switching method through CDMA code ranging will be described.

2. Zone Switching Method Using CDMA Code Set for Zone Switching

According to another exemplary embodiment of the present invention, a method for efficiently performing zone switching by additionally setting a CDMA code set for zone switching is provided. A detailed description thereof will hereinafter be described with reference to FIG. 4.

Figure 4:
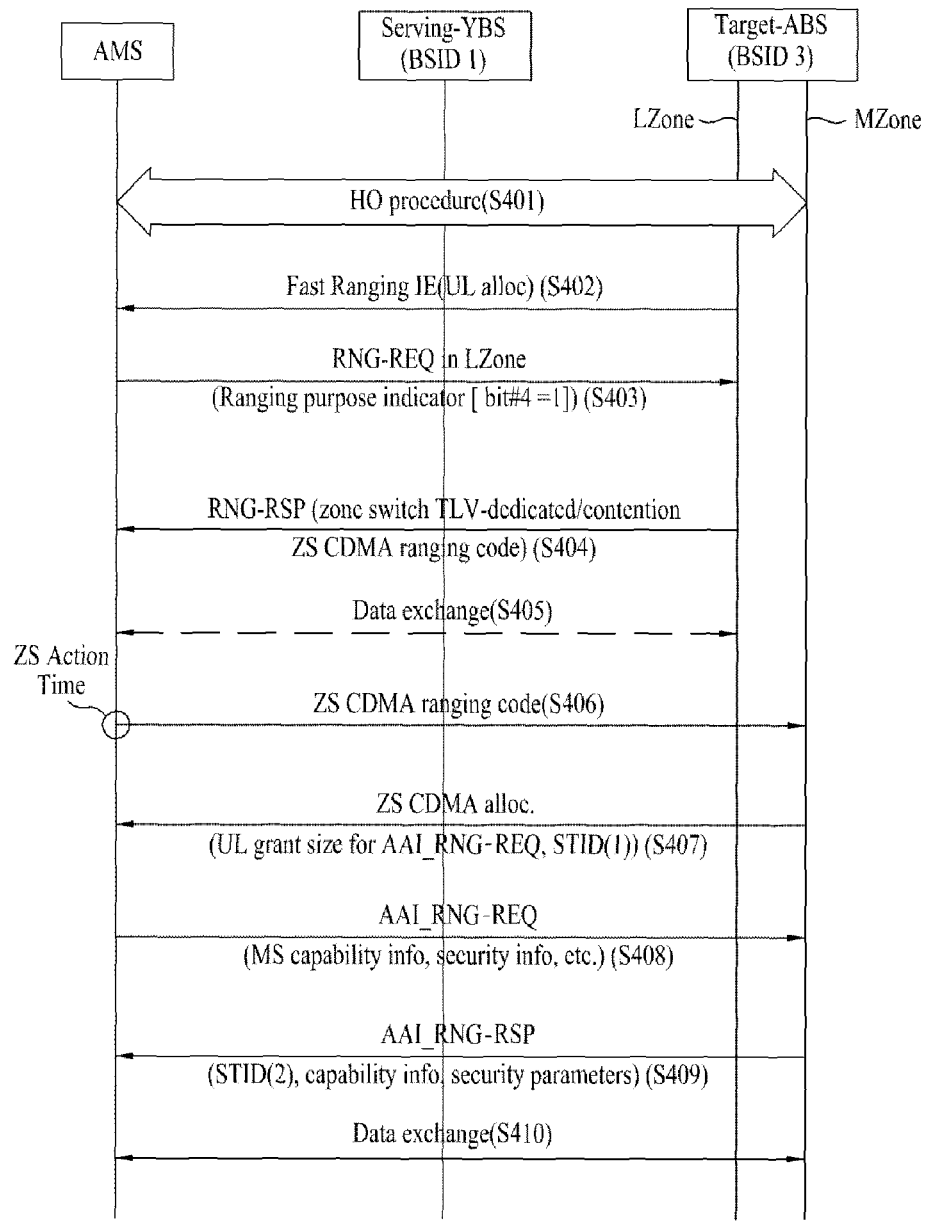
FIG. 4 is a flowchart illustrating a method for allowing an AMS to perform zone switching using a Code Division Multiple Access (CDMA) ranging code for zone switching according to another embodiment of the present invention.

FIG. 4 illustrates an example of a method for an AMS to perform zone switching through a CDMA ranging code according to another exemplary embodiment of the present invention.

In FIG. 4, it is assumed that an ABS (WirelessMAN-OFDMA Reference System/WirelessMAN-OFDMA Advanced co-existing System) (BSID 3) supporting both a YMS and an AMS is present in the neighborhood of a serving YBS (BSID 1). It is also assumed as described previously that the YMS includes only an LZone and the ABS supporting both the AMS and the YMS includes the LZone and an MZone.

Moreover, a MOB_NBR-ADV message broadcasted by the serving YBS (BSID 1) may include DCD information of neighbor BSs having different values from the serving YBS. Especially, a MAC version value of the ABS (BSID 3) may be included in DCD TLV type 148 of the MOB_NBR-ADV message broadcast by the serving YBS (BSID 1).

Steps S401 to S403 of FIG. 4 are similar to steps S301 to S303 of FIG. 3 and therefore a repetitive description thereof will be omitted.

A target ABS (BSID 3) may recognize that an AMS has requested zone switching by receiving a ranging request (RNG-REQ) message and transmits a ranging response (RNG-RSP) message including information necessary for zone switching of the AMS, that is, a zone switching TLV to the AMS at step S404.

The zone switching (ZS) TLV may include a zone switching (ZS) action time indicating the time for performing zone switching in an MZone by the AMS. The zone switching (ZS) TLV may also include a CDMA ranging code (ZS code) to be used in the MZone by the AMS for zone switching.

The ZS code refers to a CDMA ranging code transmitted to an MZone of the ABS in order for the AMS to request UL allocation information for transmitting an AAI_RNG-REQ message to the MZone of the ABS. The ZS code may additionally be re-set by separating a part of an existing CDMA code set or may be newly defined. The ZS code may be divided into a dedicated ZS CDMA ranging code allocated exclusively to a specific AMS and a contention ZS CDMA ranging code allocated by a contention based scheme.

After receiving the ranging response message, the AMS may perform data exchange by re-entering an LZone of the ABS or may immediately perform a next procedure without entering a network at step S405.

The AMS may transmit the ZS code obtained through the ranging response (RNG-RSP) message to the MZone of the AMS to request a UL grant for transmitting the AAI_RNG-REQ message (UL grant for AAI_RNG-REQ) at step S406.

In this case, if a dedicated ZS CDMA ranging code is allocated at step S404, the ZS code may be transmitted by a non-contention based scheme, and otherwise, the ZS code may be transmitted by a contention-based scheme. If the ZS code is not allocated at step S404, the AMS may randomly transmit any one selected from a previously defined ZS code set to the MZone of the ABS.

The ZS code may be transmitted at the time indicated by a zone switching action time field.

The ABS receiving the ZS code may allocate UL resources corresponding to a size of the AAI_RNG-REQ message for zone switching of the AMS to the AMS through the UL grant for the AAI_RNG-REQ message or through ZS CDMA allocation at step S407.

The UL grant may include an STID which is to be used in the ABS by the AMS.

The AMS may transmit the AAI_RNG-REQ message to the MZone of the ABS using the UL resources indicated by the received UL grant at step S408.

The AAI_RNG-REQ message may include capability information of the AMS for capability negotiation, and security information. The capability information of the AMS may include information about multi-carrier, femto capability, relay capability, physical capability, media independent handover (MIH) capability, and EMBS.

The ABS transmits information about the capability negotiation with the MS and security parameters to the AMS through an AAI_RNG-RSP message at step S409.

In this case, the ABS may additionally inform the AMS of procedures which can be omitted during zone switching through a handover optimization flag of the AAI_RNG-RSP message.

The AMS completes zone switching to the MZone of the ABS through the above-described procedures and may perform normal data exchange with the ABS at step S410.

As described above, the methods according to the exemplary embodiments of the present invention can obtain information such as an STID of an MZone of a target ABS without an additional unnecessary procedure. Since an AMS does not repetitively perform synchronization or authentication within coverage of the ABS, an unnecessary delay can be prevented. Furthermore, since an AAI_RNG-REQ message performs exchange of relatively large amounts of data such as capability negotiation or system information update, rather than a general purpose, a resource allocation problem of UL resources can be solved.

3. Zone Switching Method in ABS

According to still another exemplary embodiment of the present invention, a method for allowing an AMS to effectively perform zone switching between an LZone and an MZone within coverage of an ABS is provided. A detailed description thereof will hereinafter be described with reference to FIGS. 5 to 8.

Prior to describing the zone switching method shown in each drawing, the parts commonly applied to FIGS. 5 to 8 will hereinafter be described.

In FIGS. 5 to 8, it is assumed that an AMS receives a necessary service from an MZone of an ABS (WirelessMAN-OFDMA Reference System/WirelessMAN-OFDMA Advanced co-existing System) (BSID 2) supporting both a YMS and an AMS. In this case, the AMS may be handed over from another serving YBS through the zone switching method described in the above embodiments, or may immediately enter a next MZone after being powered on.

Figure 5:
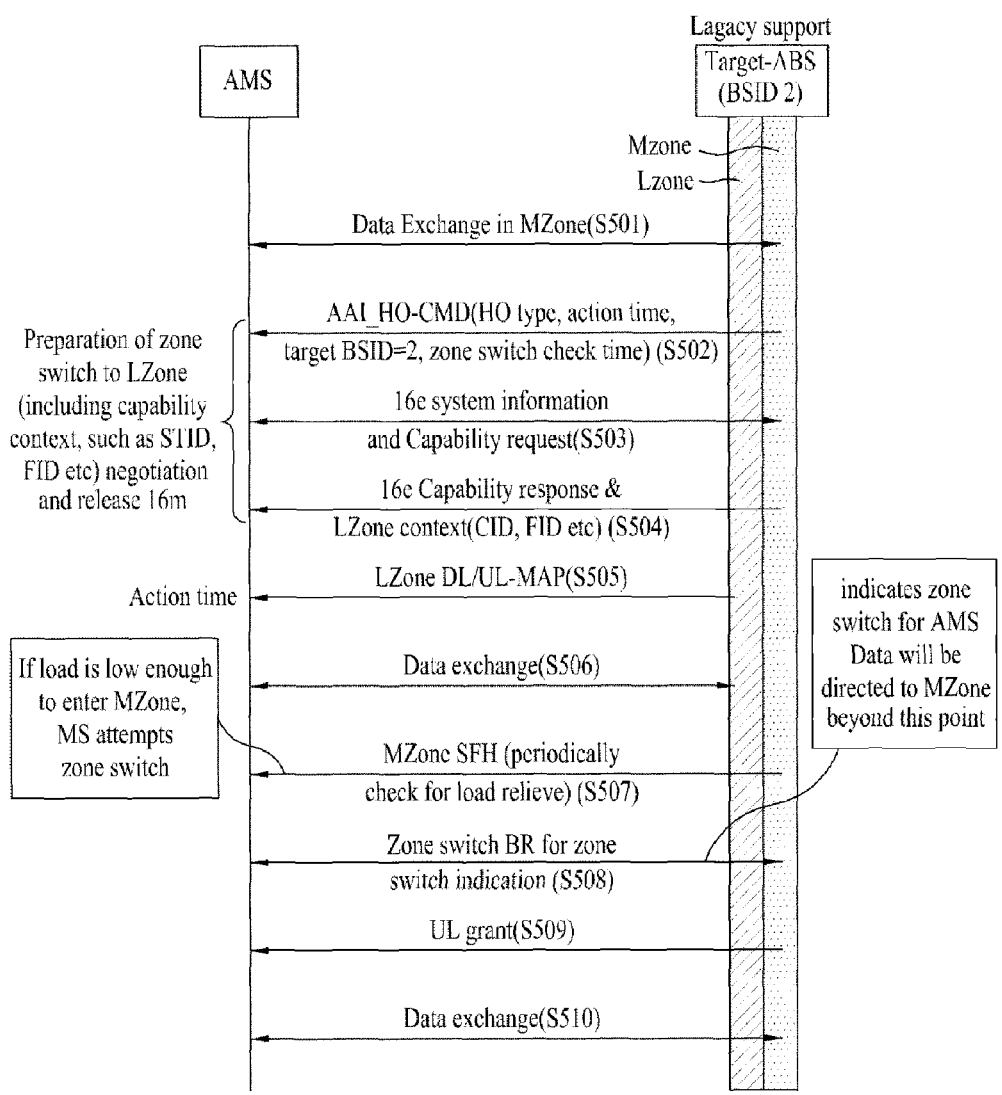
FIG. 5 is a flowchart illustrating a method for allowing an AMS to perform zone switching within coverage of an ABS according to one embodiment of the present invention.

FIG. 5 is a flowchart illustrating a method for allowing an AMS to perform zone switching within coverage of an ABS according to one embodiment of the present invention.

Referring to FIG. 5, the AMS may exchange data with the ABS in an MZone of a serving ABS at step S501.

In this case, the ABS may cause the AMS to first enter an LZone according to a load state or other circumstance of the MZone thereof. Therefore, the ABS transmits a handover (HO) command (AAI_HO-CMD) message to the AMS, such that it may command the AMS to enter an LZone at step S502.

In this case, the handover (HO) command (AAI_HO-CMD) message includes a Base Station ID (BSID) field in which a BSID of an ABS is set to 2 (BSID=2), an action time field for commanding the AMS to perform zone switching to an LZone, and a HO type field in which a predetermined value for indicating zone switching is established.

In addition, in order for the AMS to re-perform zone switching from the LZone to the MZone, the AAI_HO-CMD message may include specific information, that indicates which period is used to transmit load information of the MZone or where load information can be received. For these operations, a zone switch check time field may be used. At this time, the zone switch check time may be established in units of a frame or subframe.

Next, the AMS may request capability information by which the AMS is operated in the LZone, and system information of the LZone, and security parameters from the ABS at step S503.

As a response to the request of the AMS, the ABS may transmit capability information, system information of the LZone and security parameters of the LZone to the AMS at step S504.

In this case, the ABS transmits only mismatch system information that is different from those of the MZone among the LZone system information, such that the AMS can effectively update system information. In addition, the AMS may transmit not only information (e.g., Connection Identifier (CID), Flow Identifier (FID), etc.) needed for the LZone but also system information to the AMS.

At step S505, the AMS may receive uplink (UL) and downlink (DL) MAPs of the LZone at a specific time indicated by the action time field of the AAI_HO-CMD message that has been received at step S502.

At step S506, the AMS completes zone switching to the LZone, and can normally exchange information with the ABS.

After that, the AMS may periodically receive a Super Frame Header (SFH) of the MZone of the ABS, and may check a load status of the MZone at step S507.

In this case, the period at which the AMS receives and checks the SFH of the MZone of the ABS and checks may correspond to the time indicated by the zone switch check time of the AAI_HO-CMD message that has been received at step S502.

The AMS receives the SFH, and checks the received SFH. In this case, if the load status of the MZone of the ABS satisfies a predetermined reference, the AMS may transmit a BR message to re-perform zone switching to the MZone at step S508.

In this case, the size of the requested bandwidth may be determined according to the size of a message or data desired to be transmitted to the ABS in the MZone of the ABS. Otherwise, if the AMS desires to perform only the zone switching, the requested bandwidth may be set to '0'. A transmission format of the BR message may satisfy any one (e.g., S306 of FIG. 3) of procedures from among the above-mentioned embodiments. However, in order to prevent a difficulty encountered when the AMS re-receives the STID from the ABS, it is preferable that the ABS continuously maintain context of the AMS after the AMS has performed zone switching to the LZone.

The AMS receives the BR message from the AMS, such that it can recognize that the AMS performs zone switching to the MZone and a bandwidth having the size requested by the AMS can be assigned through the UL grant message at step S509.

After that, the AMS may normally exchange information with the ABS in the MZone at step S510.

The above-mentioned zone switching procedure can be more simplified, and a detailed description thereof will hereinafter be described with reference to FIG. 6.

Figure 6:
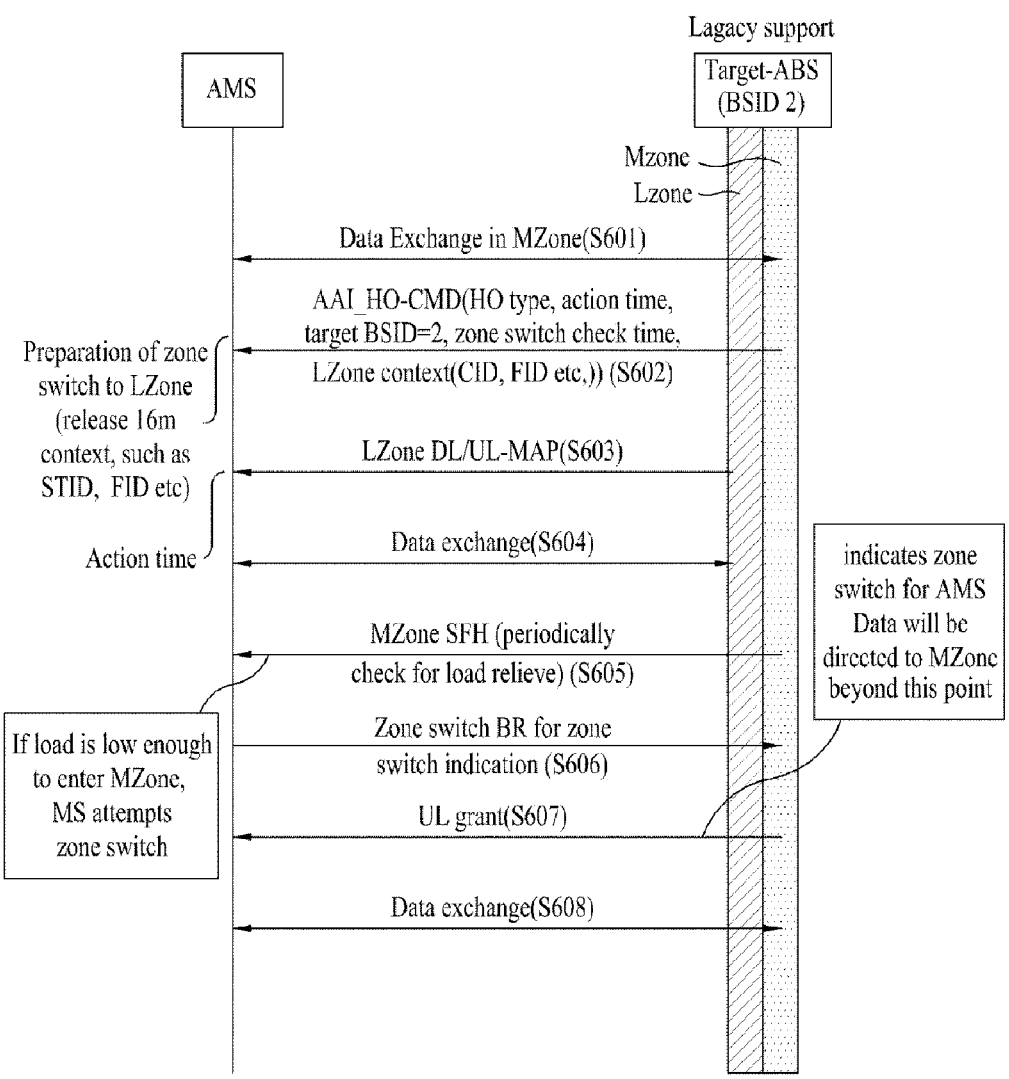
FIG. 6 is a flowchart illustrating a method for allowing an AMS to perform zone switching within coverage of an ABS according to another embodiment of the present invention.

FIG. 6 is a flowchart illustrating a method for allowing an AMS to perform zone switching within coverage of an ABS according to another embodiment of the present invention.

Referring to FIG. 6, the AMS may exchange data with the ABS in an MZone of a serving ABS at step S601.

In this case, the ABS may cause the AMS to first enter an LZone according to a load state or other circumstance of the MZone thereof. Therefore, the ABS transmits a handover (HO) command (AAI_HO-CMD) message to the AMS, such that it may command the AMS to enter an LZone at step S602.

In this case, the handover (HO) command (AAI_HO-CMD) message includes a Base Station ID (BSID) field in which a BSID of an ABS is set to 2 (BSID=2), an action time field for commanding the AMS to perform zone switching to an LZone, and a HO type field in which a predetermined value for indicating zone switching is established.

In addition, in order for the AMS to re-perform zone switching from the LZone to the MZone, the AAI_HO-CMD message may include specific information, that indicates which period is used to transmit load information of the MZone or where load information can be received. For these operations, a zone switch check time field may be used. At this time, the zone switch check time may be established in units of a frame or subframe in the same manner as in FIG. 5.

Differently from FIG. 5, the AAI_HO-CMD message may further include LZone context (e.g., CID or FID) needed for allowing the AMS to be operated in the LZone. In addition, the AAI_HO-CMD message may further include capability information of an LZone, system information of the LZone, security parameters, etc.

Therefore, steps S503 to S504 will be omitted from FIG. 5 as necessary.

Steps S603 to S608 are similar to steps S505 to S510 of FIG. 5, and as such detailed description thereof will herein be omitted for convenience of description.

Differently from the above-mentioned two methods, the ABS may also command the AMS having performed zone switching to the LZone to re-perform zone switching to the MZone. A detailed description thereof will hereinafter be described with reference to FIG. 7.

Figure 7:
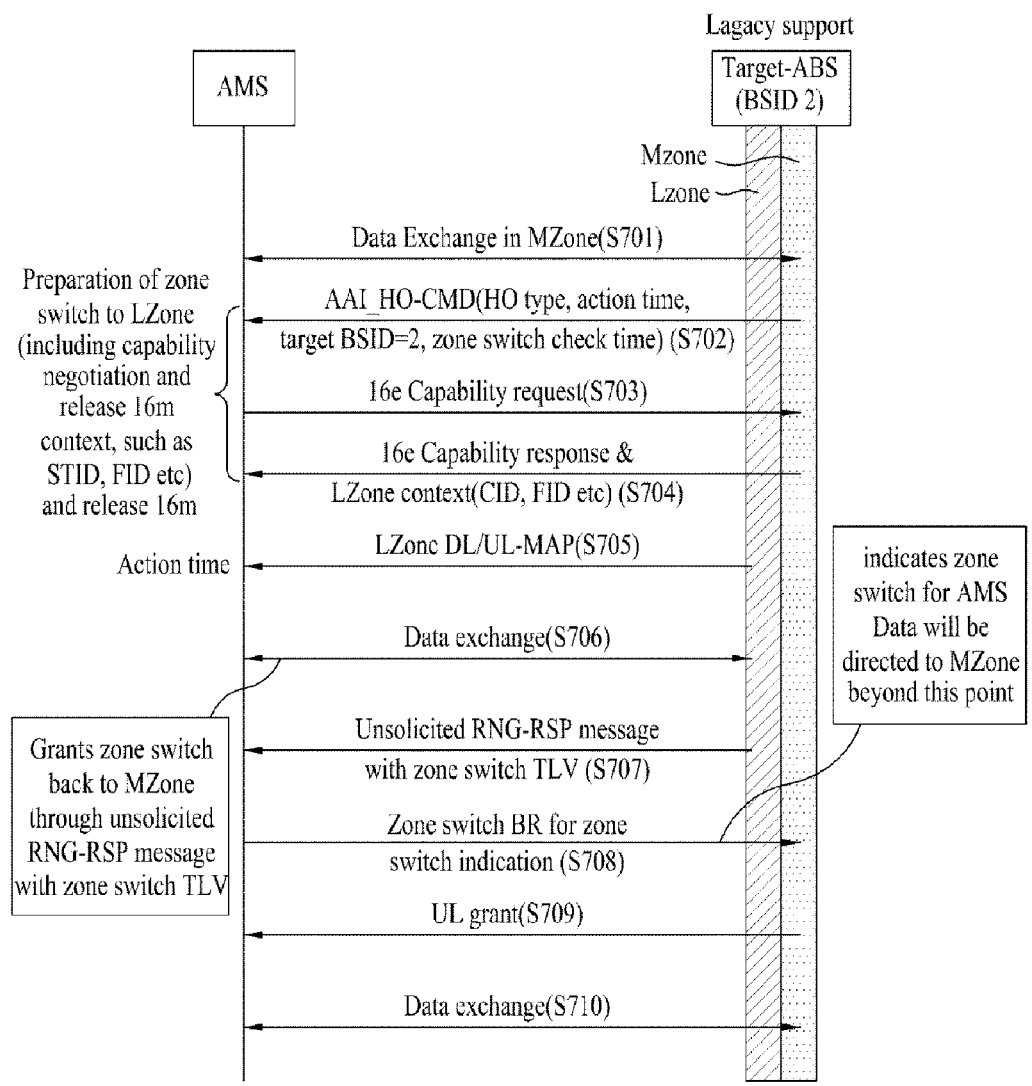
FIG. 7 is a flowchart illustrating a method for allowing an AMS to perform zone switching within coverage of an ABS according to still another embodiment of the present invention.

FIG. 7 is a flowchart illustrating a method for allowing an AMS to perform zone switching within coverage of an ABS according to still another embodiment of the present invention.

In FIG. 7, steps S701 to S706 are similar to steps S501 to S506 of FIG. 5, and as such detailed descriptions thereof will herein be omitted for convenience of description.

The ABS recognizes a load status of its own MZone. If it is determined that the recognized load status satisfies a predetermined reference, the ABS may transmit an unsolicited RNG-RSP message and command the AMS to re-perform zone switching to the MZone at step S707.

In this case, the unsolicited RNG-RSP message may include a Zone Switch TLV (ZS TLV).

The ZS TLV may include a Station ID (STID) to be used by the AMS in an MZone of the ABS, a Flow ID (FID), a 'UL grant for BR' message to transmit a BR message to the MZone, a Zone Switch action time, and the like. If the AMS retains context of an AMS, the STID and the FID may be omitted as necessary.

The AMS may recognize a zone switching indication status of the ABS through the ZS TLV contained in the RNG-RSP message. Accordingly, the AMS may transmit a BR message to the ABS, such that the STID (where, if no STID is present in the ZS TLV, a pre-allocated STID is used) and the 'UL grant for BR' message that are contained in the ZS TLV are zone-switched to the MZone of the ABS at step S708.

In this case, the size of the requested bandwidth may be determined according to the size of a message or data desired to be transmitted to the ABS in the MZone of the ABS. Otherwise, if the AMS desires to perform only the zone switching, the requested bandwidth may be set to '0'. Also, the BR message may be carried out at a time indicated by the zone switching action time.

In this case, if the zone switching (ZS) TLV does not include a UL grant for BR, the AMS may perform a 3-step or 5-step contention based BR scheme.

The AMS receives the BR message from the AMS, such that it can recognize that the AMS performs zone switching to the MZone and a bandwidth having the size requested by the AMS can be assigned through the UL grant message at step S709.

After that, the AMS may normally exchange information with the ABS in the MZone at step S710.

The above-mentioned zone switching procedure can be further simplified, and a detailed description thereof will hereinafter be described with reference to FIG. 8.

Figure 8:
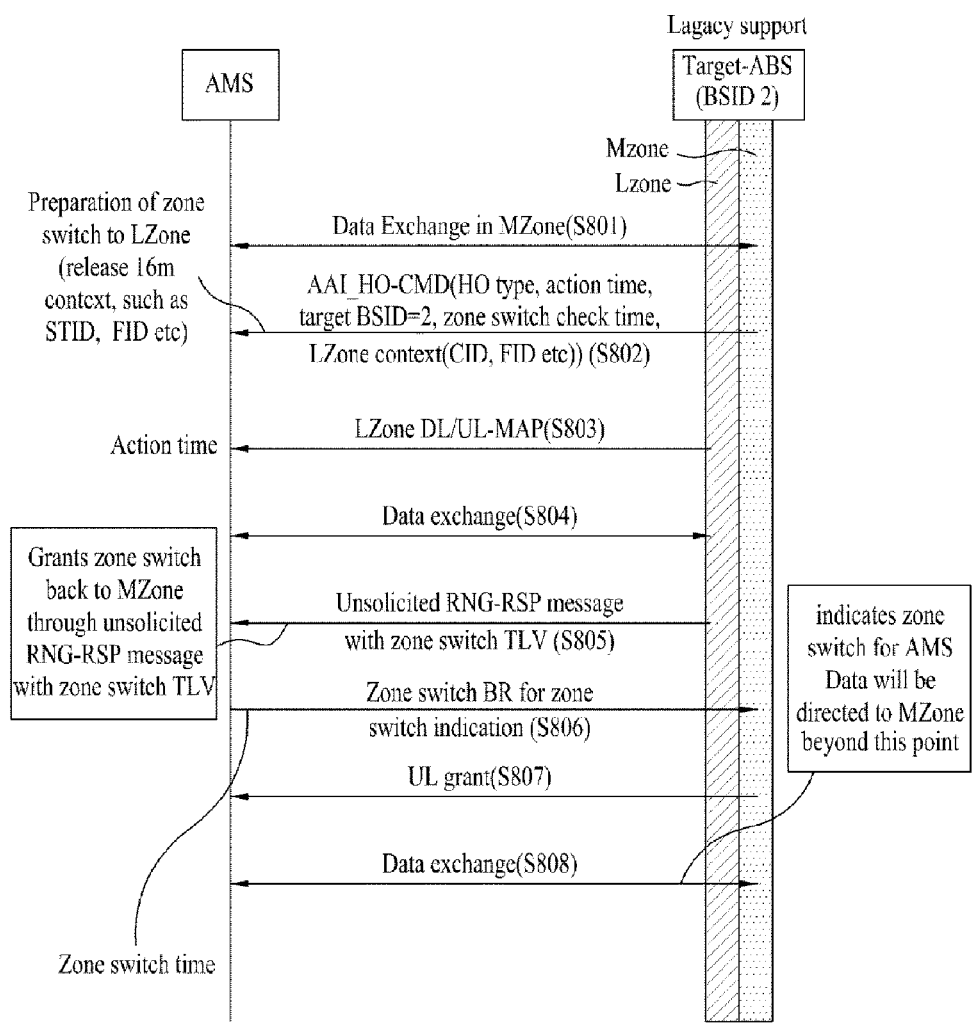
FIG. 8 is a flowchart illustrating a method for allowing an AMS to perform zone switching within coverage of an ABS according to still another embodiment of the present invention.

FIG. 8 is a flowchart illustrating a method for allowing an AMS to perform zone switching within coverage of an ABS according to still another embodiment of the present invention.

Referring to FIG. 8, the AMS may exchange data with the ABS in an MZone of a serving ABS at step S801.

In this case, the ABS may cause the AMS to first enter an LZone according to a load state or other circumstance of the MZone thereof. Therefore, the ABS transmits a handover (HO) command (AAI_HO-CMD) message to the AMS, such that it may command the AMS to enter an LZone at step S802.

In this case, the handover (HO) command (AAI_HO-CMD) message includes a Base Station ID (BSID) field in which a BSID of an ABS is set to 2 (BSID=2), an action time field for commanding the AMS to perform zone switching to an LZone, and a HO type field in which a predetermined value for indicating zone switching is established.

In addition, in order for the AMS to re-perform zone switching from the LZone to the MZone, the AAI_HO-CMD message may include specific information, that indicates which period is used to transmit load information of the MZone or where load information can be received. For these operations, a zone switch check time field may be used. At this time, the zone switch check time may be established in units of a frame or subframe in the same manner as in FIG. 5.

Differently from FIG. 7, the AAI_HO-CMD message may further include LZone context (e.g., CID or FID) needed for allowing the AMS to be operated in the LZone. Therefore, steps S703 to S704 will be omitted from FIG. 7 as necessary.

Steps S803 to S808 are similar to steps S705 to S710 of FIG. 7, and as such detailed description thereof will herein be omitted for convenience of description.

Through the above-mentioned method, the AMS can effectively perform zone switching between an LZone and an MZone.

Now a description will be made of an MS and a BS for implementing the above-described exemplary embodiments of the present invention, according to another exemplary embodiment of the present invention.

The MS may operate as a transmitter on an uplink and as a receiver on a downlink, while the BS may operate as a receiver on the uplink and as a transmitter on the downlink. That is, each of the MS and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 9.

Figure 9:
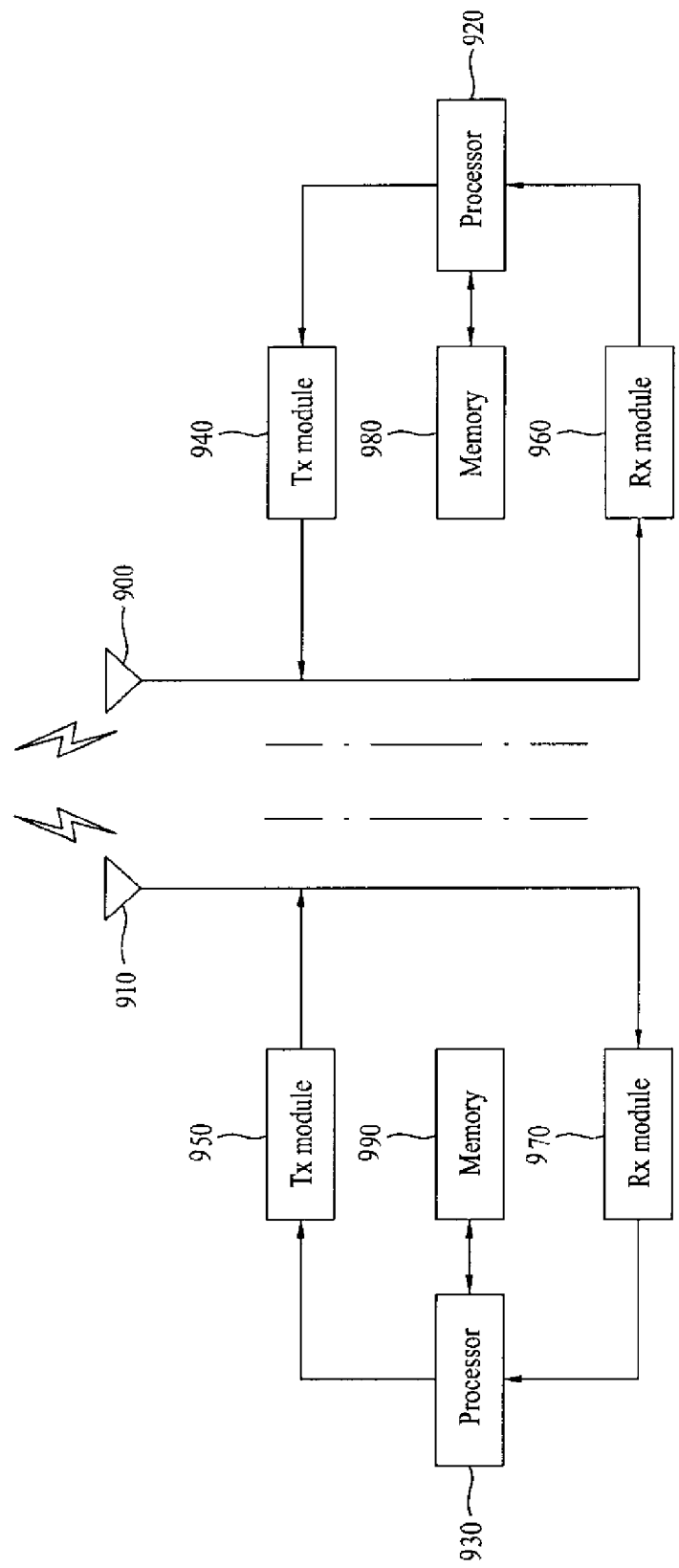
FIG. 9 is a block diagram illustrating a transmitter and a receiver according to another embodiment of the present invention.

FIG. 9 is a block diagram of a transmitter and a receiver according to another exemplary embodiment of the present invention.

Referring to FIG. 9, the left part corresponds to the transmitter and the right part corresponds to the receiver. Each of the transmitter and the receiver may include an antenna 900 or 910, a processor 920 or 930, a Transmission (Tx) module 940 or 950, a Reception (Rx) module 960 or 970, and a memory 980 or 990. The components of the transmitter are the counter parts of those of the receiver. The components of the transmitter and the receiver will be described below in more detail.

The antennas 900 and 910 include Tx antennas for transmitting signals generated from Tx modules 940 and 950 and Rx antennas for receiving radio frequency (RF) signals and providing the received RF signals to the Rx modules 960 and 970. If Multiple Input Multiple Output (MIMO) is supported, two or more antennas may be provided.

The processors 920 and 930 generally provide overall control to the MS. Especially, the processors 920 and 930 may perform a controller function for implementing the above-described exemplary embodiments of the present invention, a variable MAC frame control function based on service characteristics and a propagation environment, a handover (HO) function, an authentication and encryption function, etc.

For example, when steps related to the above-mentioned zone switching methods are performed, the processor of the MS determines context to be contained in a MAC message such as a ranging request (RNG-REQ) message, generates the RNG-REQ message, and controls the transmission (Tx) module 950 to transmit the generated RNG-REQ message to the base station (BS) at an appropriate time. In addition, the processor 930 controls the reception (Rx) module 970, and interprets context contained in the MAC message such as an UL grant or a ranging response (RNG-RSP) message, such that an operation suitable for the interpreted context can be decided and performed.

For another example, the processor of the BS interprets a MAC message or data transmitted from the MS, such that it allocates UL resources needed for the MS, generates an UL grant message that informs the MS of the allocation context, and performs scheduling to transmit the UL grant message. In addition, the processor of the BS may allow a necessary ID (such as STID, FID, or CID) to the MS, generates a MAC message including corresponding information, and transmits the generated AMC message to the MS. In other words, if the BS provides two or more standard services to MSs through different zones, the processor determines a load balance of each zone and performs proper control operations such as zone rearrangement of the MSs.

The Tx modules 940 and 950 may encode and modulate transmission data scheduled by the processors 920 and 930 in a predetermined coding and modulation scheme and provide the modulated data to the antenna 91.

The Rx modules 960 and 970 may recover original data by demodulating and decoding data received through the antennas 900 and 910 and provide the recovered data to the processors 920 and 930.

The memories 980 and 990 may store programs for processing and control of the processors 920 and 930 and temporarily store input/output (I/O) data. Each of the memories 980 and 990 may include at least one of storage media types such as a flash memory type, a hard disk type, a multimedia card micro type, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

In the meantime, the BS may perform a control function for implementing the above-described exemplary embodiments of the present invention, Orthogonal Frequency Division Multiple Access (OFDMA) packet scheduling, Time Division Duplex (TDD) packet scheduling and channelization, a variable MAC frame control function based on service characteristics and a propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it is obvious to those skilled in the art that claims that are not explicitly cited in each other in the appended claims may be presented in combination as an exemplary embodiment of the present invention or included as a new claim by a subsequent amendment after the application is filed.

The exemplary embodiments of the present invention are applicable to various wireless access systems. The exemplary embodiments of the present invention have the following effects. First, the AMS can be effectively handed over from a legacy serving base station. Second, the AMS can effectively perform zone switching within coverage of the ABS. Third, the AMS can effectively re-perform zone switching within coverage of the ABS.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for performing zone switch carried out by an advanced mobile station (AMS) operating in a first zone of a serving advanced base station (serving ABS) supporting a legacy mobile station (MS), the method comprising:
receiving a handover command (AAI-HO-CMD) message indicating zone switching to a second zone of the serving ABS from the first zone, wherein the handover command message is received in the first zone and provides information on a Connection Identifier (CID) to be used by the AMS in the second zone;
performing network reentry in the second zone using the information on the CID;
receiving an unsolicited ranging response (RNG-RSP) message, indicating zone switching to the first zone from the second zone, in the second zone after the network reentry in the second zone is finished, wherein the unsolicited ranging response (RNG-RSP) message includes zone switching information (ZS TLV) necessary for the AMS to perform the zone switch from the second zone to the first zone; and
performing network reentry by transmitting a ranging request (RNG-REQ) message and receiving a ranging response (RNG-RSP) message in the first zone,
wherein the first zone supports AMSs and the second zone supports legacy MSs.

2. The method according to claim 1, wherein the AAI-HO-CMD message includes a specific field indicating a handover (HO) type, and
wherein the specific field indicating the HO type is set to a value indicating zone switch command from the first zone to the second zone.

3. The method according to claim 2, wherein the AAI-HO-CMD message includes an action time field, and
wherein the AMS starts to perform the network reentry at a time indicated by the action time field.

4. The method according to claim 1, wherein the AAI-HO-CMD message includes at least one of capability information of the second zone, system information, security parameter, the CID, and a Flow Identifier (FID), and
wherein the CID and the FID are adapted to identify connection of the AMS in the second zone.

5. The method according to claim 1, wherein the zone switching information (ZS TLV) includes at least one of a Station Identifier (STID) for identifying the AMS in the first zone that is an MZone, a Flow Identifier (FID), a Zone Switch (ZS) action time for indicating a specific time at which zone switching to the MZone is performed, and an uplink (UL) grant for Bandwidth Request (BR) (UL grant for BR) information.

6. The method according to claim 1, wherein the first zone is an MZone and the second zone is an LZone.

7. The method of claim 1, wherein zone switching from the first zone to the second zone is indicated by the handover command (AAI-HO-CMD) message, and
wherein zone switching from the second zone to the first zone is indicated by the unsolicited ranging response (RNG-RSP) message.

8. A method for supporting zone switch of an advanced mobile station (AMS) carried out by a serving advanced base station (serving ABS) supporting a legacy mobile station (MS), the method comprising:
determining whether to switch the AMS in a first zone of the serving ABS to a second zone of the serving ABS;
transmitting a handover command (AAI-HO-CMD) message indicating zone switch to the second zone to the AMS operating in the first zone, if the AMS is determined to be switched to the second zone, wherein the handover command message is transmitted in the first zone and provides information on a Connection Identifier (CID) to be used by the AMS in the second zone;
transmitting an unsolicited ranging response (RNG-RSP) message, indicating zone switching to the first zone from the second zone, in the second zone after a network reentry of the AMS in the second zone is finished, wherein the unsolicited ranging response (RNG-RSP) message includes zone switching information (ZS TLV) necessary for the AMS to perform the zone switch from the second zone to the first zone;
receiving a ranging request (RNG-REQ) message for network reentry in the first zone; and
transmitting a ranging response (RNG-RSP) message for network reentry in the first zone,
wherein the first zone supports AMSs and the second zone supports legacy MSs.

9. The method according to claim 8, wherein the AAI-HO-CMD message includes a specific field indicating a handover (HO) type, and wherein the specific field indicating the HO type is set to a value indicating zone switch command from the first zone to the second zone.

10. The method according to claim 8, wherein the AAI-HO-CMD message includes at least one of capability information of the second zone, system information, security parameter, the CID, and a Flow Identifier (FID), and
    wherein the CID and the FID are adapted to identify connection of the AMS in the second zone.

11. The method according to claim 8, wherein the zone switching information (ZS TLV) includes at least one of a Station Identifier (STID) for identifying the AMS in the first zone, a Flow Identifier (FID), a Zone Switch (ZS) action time for indicating a specific time at which the MS performs zone switching to the first zone, and an uplink (UL) grant for Bandwidth Request (BR) (UL grant for BR) information.

12. The method according to claim 8, wherein the first zone is an MZone and the second zone is an LZone.

13. The method of claim 8, wherein zone switching from the first zone to the second zone is indicated by the handover command (AAI-HO-CMD) message, and
    wherein zone switching from the second zone to the first zone is indicated by the unsolicited ranging response (RNG-RSP) message.

14. An advanced mobile station (AMS) comprising:
    a processor; and
    a radio frequency (RF) module for transmitting and receiving a radio signal to and from the outside under the control of the processor,
    wherein the processor is configured to perform zone switch from a first zone of a serving advanced base station (serving ABS) to a second zone of the serving ABS, if a handover command (AAI-HO-CMD) message indicating the zone switch from the first zone to the second zone is received from the serving ABS through the first zone,
    wherein the processor is further configured to perform zone switch from the second zone to the first zone, if an unsolicited ranging response (RNG-RSP) message indicating the zone switch from the second zone to the first zone is received through the second zone after the network reentry in the second zone is finished,
    wherein the unsolicited ranging response (RNG-RSP) message includes zone switching information (ZS TLV) necessary for the AMS to perform the zone switch from the second zone to the first zone,
    wherein the processor is further configured to perform network reentry by exchange of a ranging request (RNG-REQ) and a ranging response (RNG-RSP) messages in the first zone, after performing zone switch from the second zone to the first zone upon the reception of the unsolicited ranging response (RNG-RSP) message,
    wherein the first zone supports AMSs and the second zone supports legacy MSs, and
    wherein the handover command message is received by the RF module in the first zone and provides information on a Connection Identifier (CID) to be used by the AMS in the second zone.

15. The advanced mobile station (AMS) according to claim 14, wherein the AAI-HO-CMD message includes a specific field indicating a handover (HO) type, and wherein the specific field indicating the HO type is set to a value indicating zone switch command from the first zone to the second zone.

16. The advanced mobile station (AMS) according to claim 14, wherein the AAI_HO-CMD message includes at least one of capability information of the second zone, system information, security parameter, the CID, and a Flow Identifier (FID), wherein the CID and the FID are adapted to identify connection of the AMS in the second zone.

17. The advanced mobile station (AMS) according to claim 14, wherein the AAI-HO-CMD message includes an action time field, and
    wherein the processor is configured to starts the zone switch at a time indicated by the action time field.

18. The advanced mobile station (AMS) of claim 14, wherein zone switching from the first zone to the second zone is indicated by the handover command (AAI-HO-CMD) message, and
    wherein zone switching from the second zone to the first zone is indicated by the unsolicited ranging response (RNG-RSP) message.

* * * * *